US010633016B2

(12) United States Patent
Goren et al.

(10) Patent No.: US 10,633,016 B2
(45) Date of Patent: Apr. 28, 2020

(54) VEHICLE, VEHICLE DRIVE ASSEMBLY AND VEHICLE STEERING ASSEMBLY

(71) Applicants: Michael Goren, Schenectady, NY (US); Jeremy E. Goren, Schenectady, NY (US)

(72) Inventors: Michael Goren, Schenectady, NY (US); Jeremy E. Goren, Schenectady, NY (US)

(73) Assignee: HURDLER MOTORS, INC., Niskayuna, NY (US)

( * ) Notice: Subject to any disclaimer, the term of this patent is extended or adjusted under 35 U.S.C. 154(b) by 34 days.

(21) Appl. No.: 16/205,710

(22) Filed: Nov. 30, 2018

(65) Prior Publication Data

US 2019/0092372 A1 Mar. 28, 2019

Related U.S. Application Data

(62) Division of application No. 14/847,969, filed on Sep. 8, 2015, now Pat. No. 10,202,141.
(Continued)

(51) Int. Cl.
*B62D 3/02* (2006.01)
*A61G 5/06* (2006.01)
(Continued)

(52) U.S. Cl.
CPC .............. *B62D 3/02* (2013.01); *A61G 5/068* (2013.01); *B60K 7/0007* (2013.01); *B60K 17/30* (2013.01);
(Continued)

(58) Field of Classification Search
CPC .......... B62D 3/02; B62D 61/12; A61G 5/068; B62B 5/02
See application file for complete search history.

(56) References Cited

U.S. PATENT DOCUMENTS 2,347,906 A 5/1944 Hatcher
2,495,169 A 1/1950 Jennings
(Continued)

FOREIGN PATENT DOCUMENTS

WO 2013133830 A2 9/2013

OTHER PUBLICATIONS

ISR/WO, Issued Nov. 15, 2016, PCT Application. PCT/US16/41708, 16 pages.
(Continued)

*Primary Examiner* — Jacob D Knutson
*Assistant Examiner* — Conan D Duda
(74) *Attorney, Agent, or Firm* — Cantor Colburn LLP

(57) ABSTRACT

A drive assembly is provided and includes a rotatable housing, a motor disposed within and to rotate with the housing, the motor including a drive element and first and second drive shafts, which are independently rotatably drivable by the drive element, a first drivable element coupled to the first drive shaft such that rotation thereof is transmitted to the first drivable element and configured to propel the housing in a first direction during first drive shaft rotation and a second drivable element coupled to the second drive shaft such that rotation thereof is transmitted to the second drivable element and configured to propel the motor in a second direction, which is transversely oriented relative to the first direction, relative to the housing during second drive shaft rotation.

9 Claims, 9 Drawing Sheets

Related U.S. Application Data

(60) Provisional application No. 62/191,835, filed on Jul. 13, 2015.

(51) Int. Cl.
  | | |
  |---|---|
  | *B62B 5/02* | (2006.01) |
  | *B62D 61/12* | (2006.01) |
  | *B60K 17/30* | (2006.01) |
  | *B60K 7/00* | (2006.01) |
  | B62D 57/032 | (2006.01) |
  | F16H 1/18 | (2006.01) |
  | B60K 17/04 | (2006.01) |
  | B62B 5/00 | (2006.01) |

(52) U.S. Cl.
CPC ............... *B62B 5/02* (2013.01); *B62D 61/12* (2013.01); *B60K 17/043* (2013.01); *B60K 2007/0038* (2013.01); *B60K 2007/0046* (2013.01); *B60K 2007/0084* (2013.01); *B60Y 2200/49* (2013.01); *B62B 5/0033* (2013.01); *B62D 57/032* (2013.01); *F16H 1/18* (2013.01)

(56) References Cited

U.S. PATENT DOCUMENTS

| | | | |
|---|---|---|---|
| 3,018,116 A * | 1/1962 | Summers | B66F 11/048 |
| | | | 280/91.1 |
| 3,366,396 A | 1/1968 | Hardy | |
| 3,438,641 A | 4/1969 | Bradley | |
| 3,554,309 A | 1/1971 | Abercrombie | |
| 3,592,282 A | 7/1971 | Soileau | |
| 3,669,466 A * | 6/1972 | Spence | B62D 3/02 |
| | | | 180/409 |
| 3,819,086 A | 6/1974 | Paolucci | |
| 3,904,216 A * | 9/1975 | Metrailer | B62D 61/12 |
| | | | 280/43 |
| 3,933,218 A | 1/1976 | Oler et al. | |
| 4,050,571 A | 9/1977 | Kushigian | |
| 4,092,569 A | 5/1978 | Herr | |
| 4,298,128 A | 11/1981 | Gattu | |
| 4,321,976 A * | 3/1982 | Reinke | B62D 57/00 |
| | | | 180/8.5 |
| 4,337,868 A | 7/1982 | Gattu | |
| 4,396,126 A | 8/1983 | Moravec et al. | |
| 4,407,406 A | 10/1983 | Norris | |
| 4,463,821 A * | 8/1984 | Falamak | B62D 7/026 |
| | | | 180/168 |
| 4,533,998 A * | 8/1985 | Falamak | B62D 9/00 |
| | | | 180/168 |
| 4,540,142 A | 9/1985 | Veauz | |
| 4,551,059 A | 11/1985 | Petoia | |
| 4,569,409 A * | 2/1986 | Kluth | A61G 5/061 |
| | | | 180/8.2 |
| 4,761,841 A | 8/1988 | Larsen | |
| 4,790,548 A | 12/1988 | Decelles et al. | |
| 4,934,726 A * | 6/1990 | Daenens | B62D 7/026 |
| | | | 280/103 |
| 4,960,290 A | 10/1990 | Bose | |
| 5,219,412 A * | 6/1993 | Kubo | A47L 11/14 |
| | | | 15/49.1 |
| 5,245,238 A | 9/1993 | Lynch | |
| 5,310,140 A | 5/1994 | Veaux | |
| 5,351,773 A * | 10/1994 | Yanagisawa | B62D 57/032 |
| | | | 180/8.3 |
| 5,374,879 A | 12/1994 | Pin | |
| 5,558,174 A | 9/1996 | Avitan et al. | |
| 5,580,314 A | 12/1996 | Moriyama | |
| 5,653,301 A | 8/1997 | Andre | |
| 5,676,215 A | 10/1997 | Misawa | |
| 5,701,965 A | 12/1997 | Kamen et al. | |
| 5,722,504 A | 3/1998 | Gaetani | |
| 5,731,987 A | 3/1998 | Strong | |
| 5,772,233 A | 6/1998 | Papendick | |
| 5,833,248 A | 11/1998 | Eguchi | |
| 5,933,934 A | 8/1999 | Giannetti | |
| 6,193,612 B1 | 2/2001 | Craig | |
| 6,232,690 B1 | 5/2001 | Schmider | |
| 6,311,794 B1 | 11/2001 | Morrell et al. | |
| 6,328,125 B1 | 12/2001 | Van Den Brink et al. | |
| 6,341,784 B1 | 1/2002 | Carstens | |
| 6,343,556 B1 | 2/2002 | Lanphear | |
| 6,368,225 B1 | 4/2002 | Breese | |
| 6,455,969 B1 | 9/2002 | Chen | |
| 6,484,829 B1 | 11/2002 | Cox | |
| 6,484,839 B2 | 11/2002 | Cole | |
| 6,491,234 B2 | 12/2002 | Beggs | |
| 6,527,644 B2 | 3/2003 | Glowacki | |
| 6,543,266 B1 | 4/2003 | Jaekel | |
| 6,547,340 B2 | 4/2003 | Harris | |
| 6,588,065 B1 | 7/2003 | Tucker, III | |
| 6,615,938 B2 | 9/2003 | Morrell et al. | |
| 6,695,084 B2 * | 2/2004 | Wilk | A61G 5/061 |
| | | | 180/117 |
| 6,722,458 B2 | 4/2004 | Hofbauer | |
| 6,845,830 B2 * | 1/2005 | Tojo | A61G 5/046 |
| | | | 180/8.3 |
| 6,863,288 B2 | 3/2005 | Van Den Brink | |
| 6,874,432 B2 | 4/2005 | Lanphear | |
| 6,945,541 B2 | 9/2005 | Brown | |
| 7,032,859 B2 | 4/2006 | Mohr | |
| 7,066,041 B2 | 6/2006 | Nielsen | |
| 7,080,436 B2 | 7/2006 | Durand | |
| 7,111,700 B2 | 9/2006 | Czysz | |
| 7,207,890 B2 | 4/2007 | Lukac | |
| 7,246,671 B2 | 7/2007 | Goren et al. | |
| 7,246,672 B2 | 7/2007 | Shirai | |
| 7,316,282 B2 | 1/2008 | Mulhern et al. | |
| 7,445,178 B2 | 11/2008 | McCoskey et al. | |
| 7,562,885 B2 | 7/2009 | Marcacci | |
| 7,648,148 B1 | 1/2010 | Mercier | |
| 7,722,063 B2 | 5/2010 | Dieziger | |
| 7,806,644 B2 | 10/2010 | Yuyama et al. | |
| 7,812,490 B2 | 10/2010 | Pedrazzini | |
| 7,871,234 B2 | 1/2011 | Yuyama et al. | |
| 8,186,199 B2 | 5/2012 | Wagner | |
| 8,215,423 B2 * | 7/2012 | Terry | G21F 5/14 |
| | | | 180/24 |
| 8,220,349 B2 | 7/2012 | Prichard | |
| 8,253,294 B1 | 8/2012 | Wishart | |
| 8,283,831 B1 | 10/2012 | Kaminsky | |
| 8,418,787 B2 * | 4/2013 | Bouhraoua | B62D 61/125 |
| | | | 180/24.02 |
| 8,499,867 B2 | 8/2013 | Marcacci | |
| 8,531,072 B2 | 9/2013 | Wishart | |
| 8,628,289 B1 | 1/2014 | Benedict et al. | |
| 8,650,710 B1 | 2/2014 | Waggener | |
| 8,651,228 B2 | 2/2014 | Eick et al. | |
| 8,661,596 B2 | 3/2014 | Jungnickel | |
| 8,667,659 B2 | 3/2014 | Blacklin | |
| 8,668,163 B2 | 3/2014 | Colantonio et al. | |
| 8,668,475 B2 | 3/2014 | Gregory et al. | |
| 8,695,746 B2 | 4/2014 | Holroyd et al. | |
| 8,776,917 B2 | 7/2014 | Bouhraoua et al. | |
| 8,781,684 B2 | 7/2014 | Bruce | |
| 8,833,780 B2 | 9/2014 | Cheng et al. | |
| 8,857,553 B2 * | 10/2014 | Nakamura | F28D 1/00 |
| | | | 180/219 |
| 8,910,326 B2 | 12/2014 | Wilson | |
| 8,925,475 B2 | 1/2015 | Harbin | |
| 8,926,217 B1 | 1/2015 | Smith | |
| 8,979,102 B1 | 3/2015 | Prentice | |
| 8,987,962 B2 | 3/2015 | Kim | |
| 9,573,421 B2 | 2/2017 | Tiilikainen et al. | |
| 9,629,761 B2 | 4/2017 | Hacikadiroglu et al. | |
| 9,661,923 B2 | 5/2017 | Lanphear | |
| 9,694,848 B1 * | 7/2017 | Ostlie | B62D 9/00 |
| 9,789,799 B2 | 10/2017 | Pawluk | |
| 9,796,568 B1 | 10/2017 | Gonzales et al. | |
| 9,808,545 B2 | 11/2017 | Mauzerall et al. | |
| 9,834,263 B1 | 12/2017 | Nooren | |
| 9,937,968 B2 * | 4/2018 | Goren | B62D 39/00 |

(56) References Cited

U.S. PATENT DOCUMENTS

| | | | |
|---|---|---|---|
| 2002/0149176 A1* | 10/2002 | Miller | B62B 3/027 |
| | | | 280/651 |
| 2003/0015359 A1 | 1/2003 | Hanscombe | |
| 2003/0127259 A1 | 7/2003 | Logstrup | |
| 2003/0183427 A1 | 10/2003 | Tojo et al. | |
| 2006/0145433 A1* | 7/2006 | Kim | A61G 5/046 |
| | | | 280/5.28 |
| 2006/0151218 A1 | 7/2006 | Goren et al. | |
| 2007/0194540 A1* | 8/2007 | Caspi | B62B 5/02 |
| | | | 280/5.22 |
| 2010/0155168 A1 | 6/2010 | Mies | |
| 2011/0067513 A1 | 3/2011 | Wilson | |
| 2012/0028216 A1 | 2/2012 | Moessle | |
| 2012/0175172 A1 | 7/2012 | Bouhraoua et al. | |
| 2012/0241237 A1 | 9/2012 | Holroyd et al. | |
| 2013/0038179 A1 | 2/2013 | Mirmobin | |
| 2013/0218436 A1 | 8/2013 | Kirby | |
| 2014/0326521 A1* | 11/2014 | Hacikadiroglu | A61G 5/061 |
| | | | 180/8.2 |
| 2015/0075306 A1 | 3/2015 | Castelli | |
| 2017/0066323 A1* | 3/2017 | Goren | B60K 7/0007 |
| 2019/0061812 A1* | 2/2019 | Hecker | B62D 1/20 |
| 2019/0092372 A1* | 3/2019 | Goren | B60K 7/0007 |
| 2020/0000659 A1* | 1/2020 | Linscott | A61G 5/068 |

OTHER PUBLICATIONS

Depangher, Thesis—Design and Implementation of Eight-Legged Robotic Transporter, Sep. 2013, 118 pages.

* cited by examiner

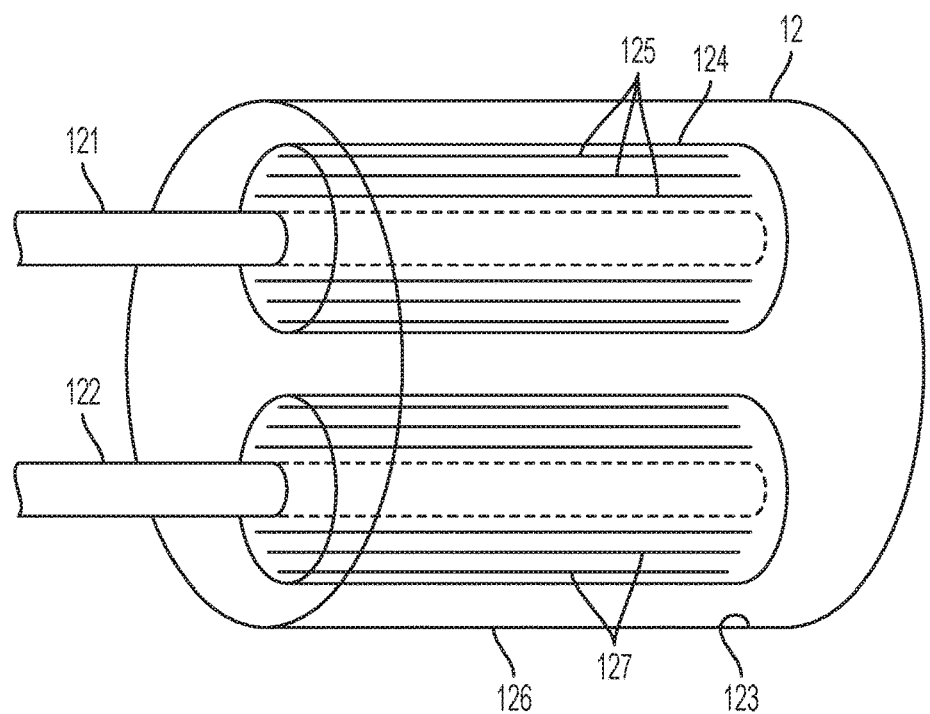
FIG. 2
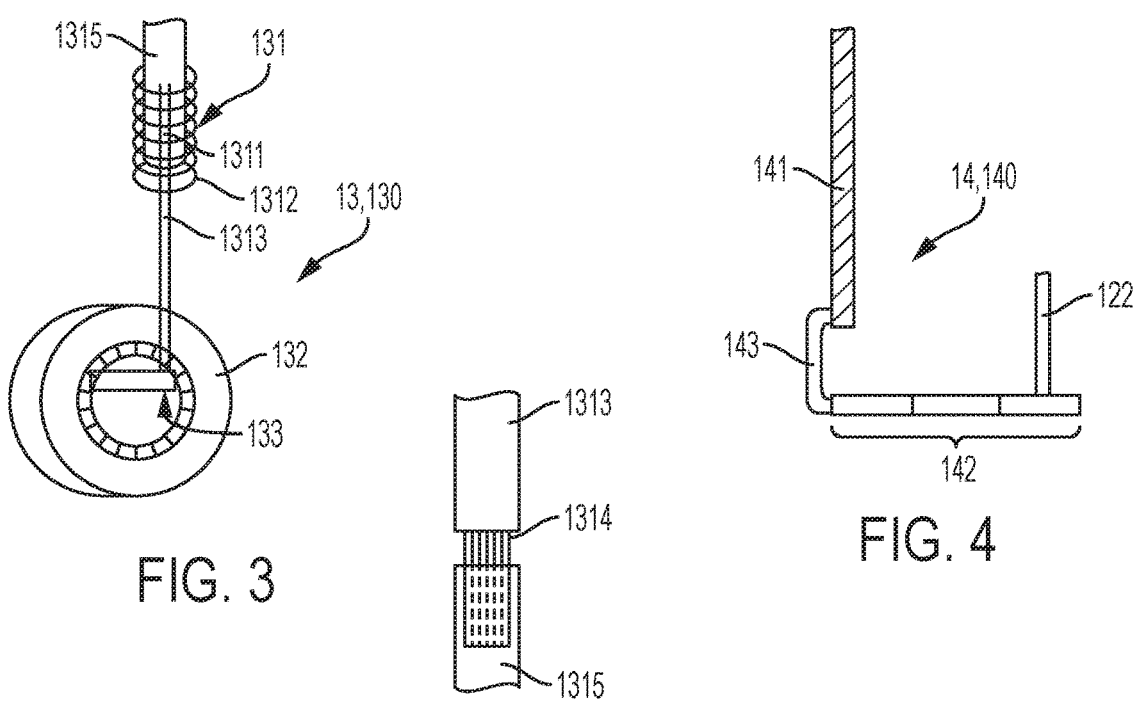
FIG. 3
FIG. 3A
FIG. 4

VEHICLE, VEHICLE DRIVE ASSEMBLY AND VEHICLE STEERING ASSEMBLY

CROSS REFERENCE TO RELATED APPLICATION

This application claims the benefit of U.S. Non-Provisional application Ser. No. 14/847,969, filed Sep. 8, 2015 that claims the benefit of priority to U.S. Provisional Application No. 62/191,835, which was filed on Jul. 13, 2015. The entire disclosures of U.S. Non-Provisional application Ser. No. 14/847,969 and U.S. Provisional Application No. 62/191,835 are incorporated herein by reference.

BACKGROUND OF THE DISCLOSURE

The subject matter disclosed herein relates to a vehicle and, more particularly, to a vehicle drive assembly, a vehicle steering assembly and a vehicle with drive and steering assemblies.

Humans and cargo are transported by many types of vehicles and methods. Most such vehicles have one or two power-driven axles and can be provided as wheelchairs, carts, carriages, automobiles, wagons, recreational vehicles, motorcycles, trucks, chariots, gurneys and the like. Typically these types of vehicles cannot climb stairs or climb into a van or truck while keeping their platform and rider level without ramp and/or user assistance. Also, these vehicles often cannot climb over obstacles, such as factory floor modules or sidewalk curbs.

Even if vehicles, such as those listed above, could climb up and over stairs and obstacles, the vehicles would be particularly heavy and may not be able to navigate multiple types of terrains.

BRIEF DESCRIPTION OF THE DISCLOSURE

According to one aspect of the disclosure, a drive assembly is provided and includes a rotatable housing, a motor disposed within and to rotate with the housing, the motor including a drive element and first and second drive shafts, which are independently rotatably drivable by the drive element, a first drivable element coupled to the first drive shaft such that rotation thereof is transmitted to the first drivable element and configured to propel the housing in a first direction during first drive shaft rotation and a second drivable element. The second drivable element is coupled to the second drive shaft such that rotation thereof is transmitted to the second drivable element and configured to propel the motor in a second direction, which is transversely oriented relative to the first direction, relative to the housing during second drive shaft rotation.

According to additional or alternative embodiments, the first and second drive shafts extend outwardly from a same end of the drive element.

According to additional or alternative embodiments, the first and second drive shafts extend outwardly from opposite ends of the drive element.

According to additional or alternative embodiments, the first drivable element includes a ground wheel and the second drivable element includes an elevator assembly.

According to additional or alternative embodiments, the drive assembly further includes a shock absorber between the ground wheel and the first drive shaft.

According to additional or alternative embodiments, the drive assembly further includes a transverse gear train interposed between the elevator assembly and the second drive shaft.

According to another aspect of the disclosure, a steering assembly is provided and includes an input portion by which operator commands are receivable, a transmission portion including drive shafts respectively arranged along opposite sides of a deck, the transmission portion being configured to transmit steering movements associated with the operator commands from the input portion toward legs extending from the deck toward a ground level at fore and aft positions and the opposite sides of the deck and couplings by which each of the legs is coupled to one of the drive shafts. Each of the couplings is configured to rotate the corresponding leg in accordance with the steering movements and a fore or aft position of the corresponding leg.

According to additional or alternative embodiments, the input portion includes an operator accessible input device.

According to additional or alternative embodiments, at least the input portion is disposed above a plane of the deck.

According to additional or alternative embodiments, the input portion includes at least first and second transverse drive shafts.

According to additional or alternative embodiments, for each opposite side of the deck, the legs include first and second fore legs and first and second aft legs.

According to additional or alternative embodiments, the couplings rotate the first and second fore legs by different degrees and the first and second aft legs by different degrees.

According to yet another aspect of the invention, a vehicle is provided and includes a deck on which an operator control portion is supportively disposed and from fore and aft positions and opposite sides of which legs extend toward a ground level, each leg being rotatable in accordance with operator inputted commands and a respective fore or aft position thereof, a transmission system by which operator input commands are transmitted from the operator control portion to each leg as rotation driving steering movements in accordance with the fore or aft position of each leg and a drive assembly. The drive assembly is disposed within each leg and includes a motorized drive element, a first drivable element configured for drive element-driven propulsion in a first direction and a second drivable element configured to propel the drive element in a second direction, which is transversely oriented relative to the first direction.

According to additional or alternative embodiments, the operator control portion includes an operator accessible input device disposed above a plane of the deck.

According to additional or alternative embodiments, the transmission system includes drive shafts respectively arranged along the opposite sides of the deck and couplings by which each of the legs is coupled to one of the drive shafts.

According to additional or alternative embodiments, each of the couplings is configured to rotate the corresponding leg in accordance with the steering movements and the fore or aft position of the corresponding leg.

According to additional or alternative embodiments, for each opposite side of the deck, the legs include first and second fore legs and first and second aft legs.

According to additional or alternative embodiments, the drive assembly includes first and second drive shafts associated with the first and second drivable elements, respectively, which extend outwardly from a same end of the motor.

According to additional or alternative embodiments, the first drivable element includes a ground wheel and the second drivable element includes an elevator assembly.

According to additional or alternative embodiments, the vehicle further includes a shock absorber between the ground wheel and the first drive shaft and a transverse gear train interposed between the elevator assembly and the second drive shaft.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 2 is a side view of a motor of the drive assembly of FIG. 1;

FIG. 3 is a perspective view of a first drivable element of the drive assembly of FIG. 1;

FIG. 3A is a side view of a splined shaft arrangement of the first drivable element;

FIG. 4 is a perspective view of a second drivable element of the drive assembly of FIG. 1;

The detailed description explains embodiments of the disclosure, together with advantages and features, by way of example with reference to the drawings.

DETAILED DESCRIPTION OF THE DISCLOSURE

As will be described below, a drive assembly, a steering assembly and a vehicle including one or both of a drive assembly and a steering assembly are provided. The vehicle may be provided as a human transporter similar to the human transporter disclosed in the "STAIR-CLIMBING HUMAN TRANSPORTER" of U.S. Pat. No. 7,246,671, the entire disclosures of which are incorporated herein by reference.

Figure 1:
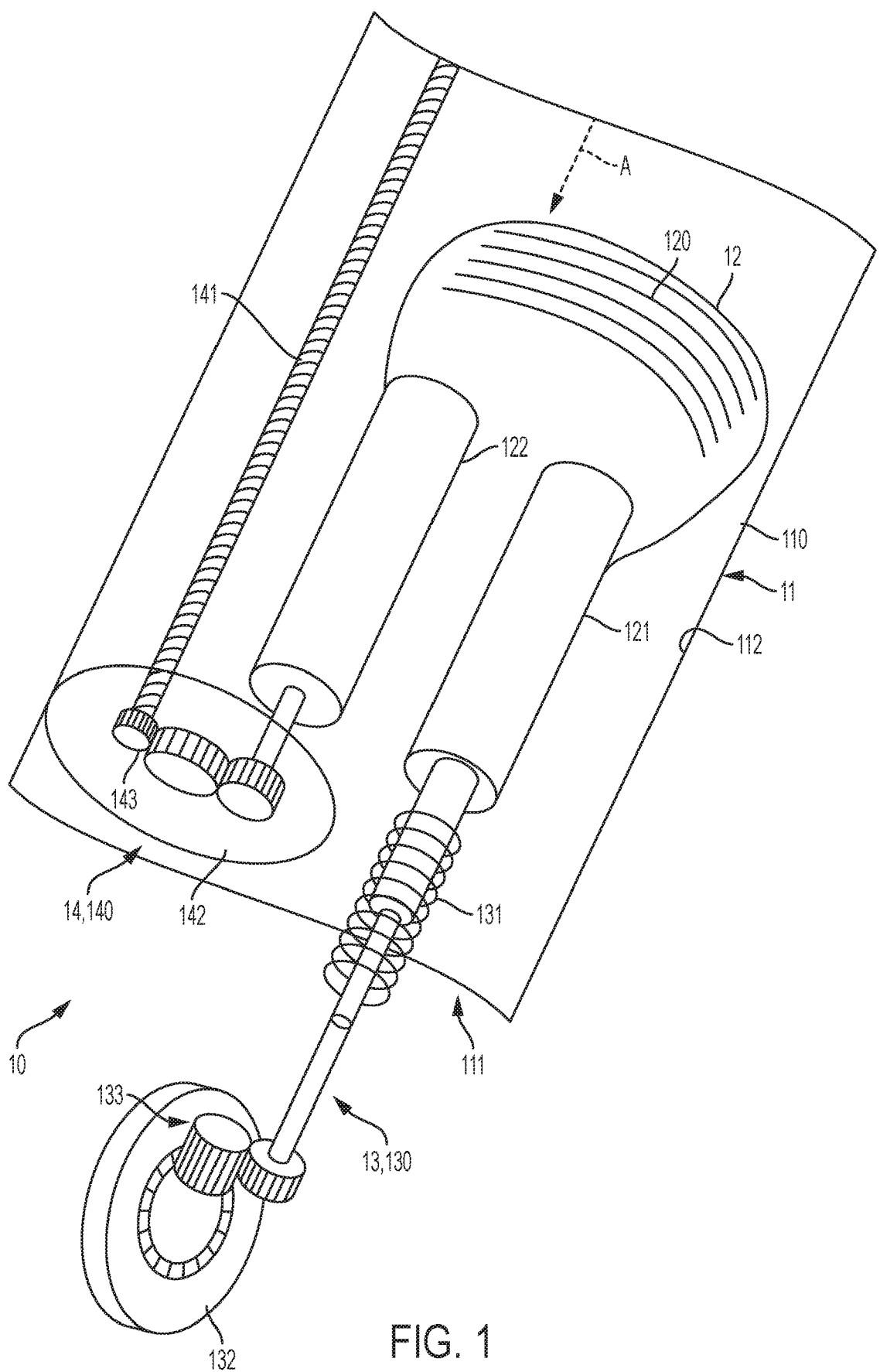
FIG. 1 is a perspective view of a drive assembly in accordance with embodiments.

With reference to FIG. 1, a drive assembly 10 is provided. The drive assembly 10 includes a rotatable housing 11 as well as a motor 12 disposed within the rotatable housing 11 and to rotate with the rotatable housing 11, a first drivable element 13 and a second drivable element 14. The rotatable housing 11 may be provided as a tubular body 110 having at least one open longitudinal end 111 and a substantially cylindrical sidewall 112 that defines a longitudinal axis A. The rotatable housing 11 is rotatable about the longitudinal axis A.

The motor 12 may be provided as an electric motor that includes a drive element 120, a first drive shaft 121 and a second drive shaft 122. The first drive shaft 121 may be, but does not need to be, substantially aligned with the longitudinal axis A. In any case, the first drive shaft 121 and the second drive shaft 122 may extend outwardly from a same end plate of the drive element 120 to be substantially parallel and at least partially coaxial with one another. The drive element 120 is configured to independently drive respective rotations of each of the first drive shaft 121 and the second drive shaft 122 about their respective longitudinal axes.

With reference to FIG. 2, the motor 12 may include a dual rotor shaft housing 123 that is formed to define a two-part interior in which a first stator 124 and first windings 125 are disposed to surround the first drive shaft 121 and in which a second stator 126 and second windings 127 are disposed to surround the second drive shaft 122. The first and second windings 125 and 127 may be independently energized to independently drive the respective rotations of the first drive shaft 121 and the second drive shaft 122.

With reference back to FIG. 1 and, with additional reference to FIG. 3, the first drivable element 13 may be provided as a ground wheel assembly 130 and is coupled to the first drive shaft 121. Thus, rotation of the first drive shaft 121 about its longitudinal axis is transmitted to the first drivable element 13. The first drive element 13 is configured to propel the rotatable housing 11 forwardly or reversely in a first planar direction during first drive shaft rotation in accordance with a forward or reverse direction of the rotation of the first drive shaft 121 by the drive element 120. Where the first drivable element 13 is the ground wheel assembly 130, the forward and reverse rotations of the first drive shaft 121 result in the first drivable element 13 propelling the rotatable housing 11 along a ground surface in corresponding forward and reverse directions.

In a case where the first drivable element 13 is the ground wheel assembly 130, the drive assembly 10 may further include a shock absorber 131 disposed between the ground wheel 132 and the first drive shaft 121 and a gear train or bevel gear arrangement 133 as shown in FIG. 3. The shock absorber 131 includes a telescoping central shaft 1311 and an elastic element 1312 that absorbs and dampens shocks applied to the first drive shaft 121 by the ground surface. The gear train or bevel gear arrangement 133 converts rotational energy of the first drive shaft 121 into propulsive energy that is transmittable to the ground wheel 132.

With reference to FIG. 3A, the telescoping central shaft 1311 may be provided as a splined shaft including a first part 1313, a second part 1314 that extends from an end of the first part 1313 and a third part 1315. The first part 1313 has an outer diameter that is similar to that of the third part 1315. The second part 1314 has a smaller outer diameter than the first part 1313, extends from an end of the first part 1313 and includes gear teeth arrayed about an exterior surface thereof. The third part 1315 has an inner diameter that is similar to the outer diameter of the second part 1314 and includes gear teeth arrayed about an interior surface thereof. Thus, the second part 1314 is configured for insertion into the third part 1315 such that as the first part 1313 is rotated, such rotation is transferred to the third part 1315 by the second part 1314 even as the first and second parts 1313 and 1314 translate axially with respect to the third part 1315.

With continued reference to FIG. 1 and, with additional reference to FIG. 4, the second drivable element 14 may be provided as an elevator assembly 140 and is coupled to the second drive shaft 122. Thus, rotation of the second drive shaft 122 about its longitudinal axis is transmitted to the second drivable element 14. The second drivable element 14 is configured to propel the motor 12, the first drive shaft 121 and the first drivable element 13 forwardly or reversely in a second planar direction relative to the rotatable housing 11 during forward or reverse rotations of the second drive shaft 122 by the drive element 120. The second planar direction may be transversely oriented or perpendicular relative to the first planar direction. Where the second drivable element 14 is the elevator assembly 140, the forward and reverse rotations of the second drive shaft 122 result in the second drivable element 14 propelling the motor 12, the first drive shaft 121 and the first drivable element 13 upwardly or downwardly relative to the rotatable housing 11 and the open longitudinal end 111.

In a case where the second drivable element 14 is the elevator assembly 140, the drive assembly 10 may further include a vertical gear 141, a radial, transverse gear train 142 and a gear train or bevel gear arrangement 143 as shown in FIG. 4. The vertical gear 141 runs along the sidewall 112 in parallel with the longitudinal axis A and the radial, transverse gear train 142 extends radially outwardly from the second drive shaft 122 toward the vertical gear 141. The gear train or bevel gear arrangement 143 is configured to convert rotational energy of both the second drive shaft 122 and the radial, transverse gear train 142 into climbing energy that is usable by the gear train or bevel gear arrangement 143 to climb up or down the vertical gear 141.

Figure 5:
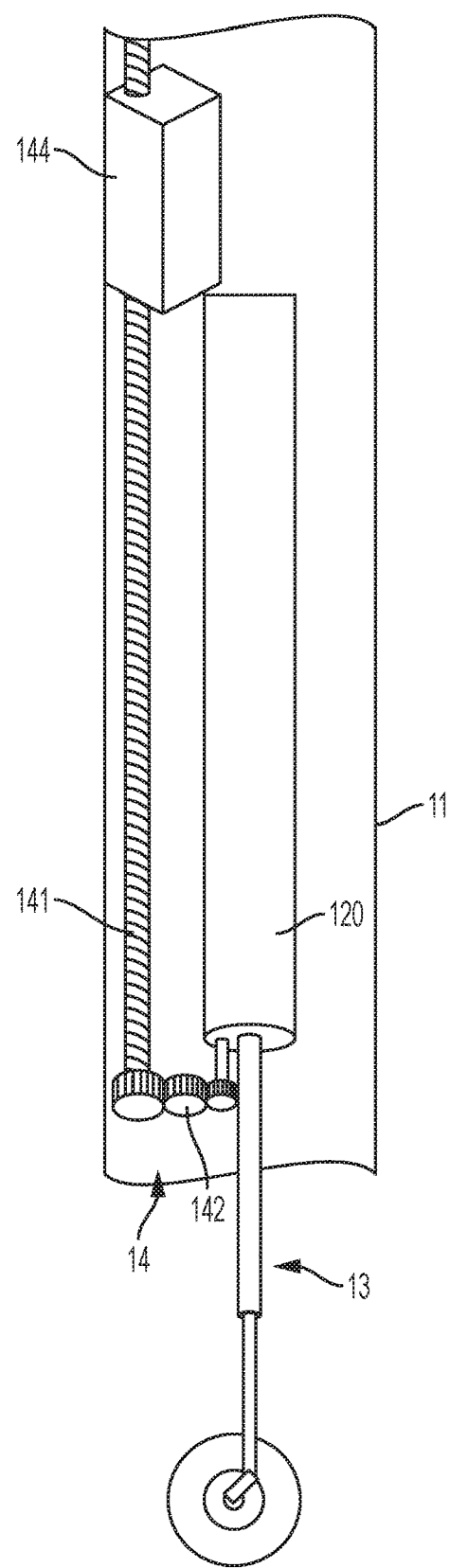
FIG. 5 is a perspective view of a second drivable element of the drive assembly of FIG. 1 in accordance with alternative embodiments.

In accordance with alternative embodiments and, with reference to FIG. 5, the vertical gear 141 may threadably engage with and extend through a nut arrangement 144. In such cases, the radial, transverse gear train 142 could be directly engaged with the vertical gear 141 such that rotations of the second drive shaft 122 and the radial, transverse gear train 142 are transmitted to the vertical gear 141 and resulting rotations of the vertical gear 141 cause the vertical gear 141 (along with the motor 12, the first drive shaft 121 and the first drivable element 13) to be driven upwardly or downwardly by the nut arrangement 144.

Figure 6:
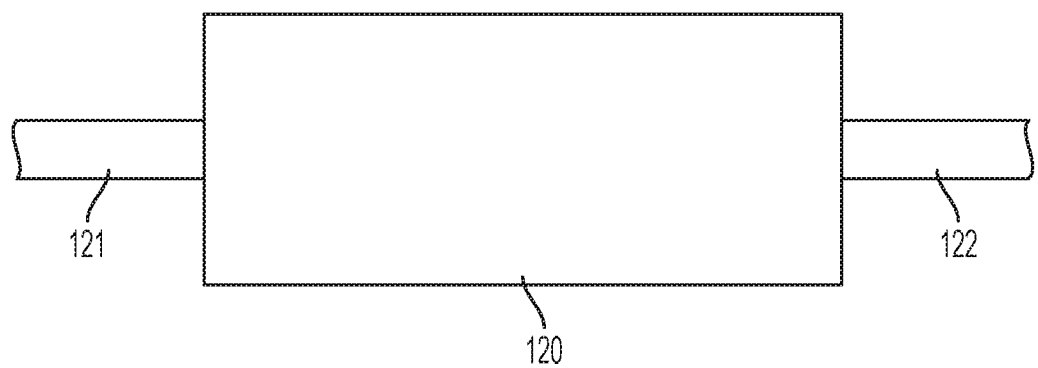
FIG. 6 is a side view of a drive assembly in accordance with alternative embodiments.

Although the embodiments of FIG. 1 indicate that the first and second drive shafts 121 and 122 extend outwardly from a same end plate of the drive element 120, it is to be understood that this is not required and that other embodiments exist. For example, with reference to FIG. 6, the first and second drive shafts 121 and 122 may extend outwardly from opposite end plates of the drive element 120.

Figure 7:
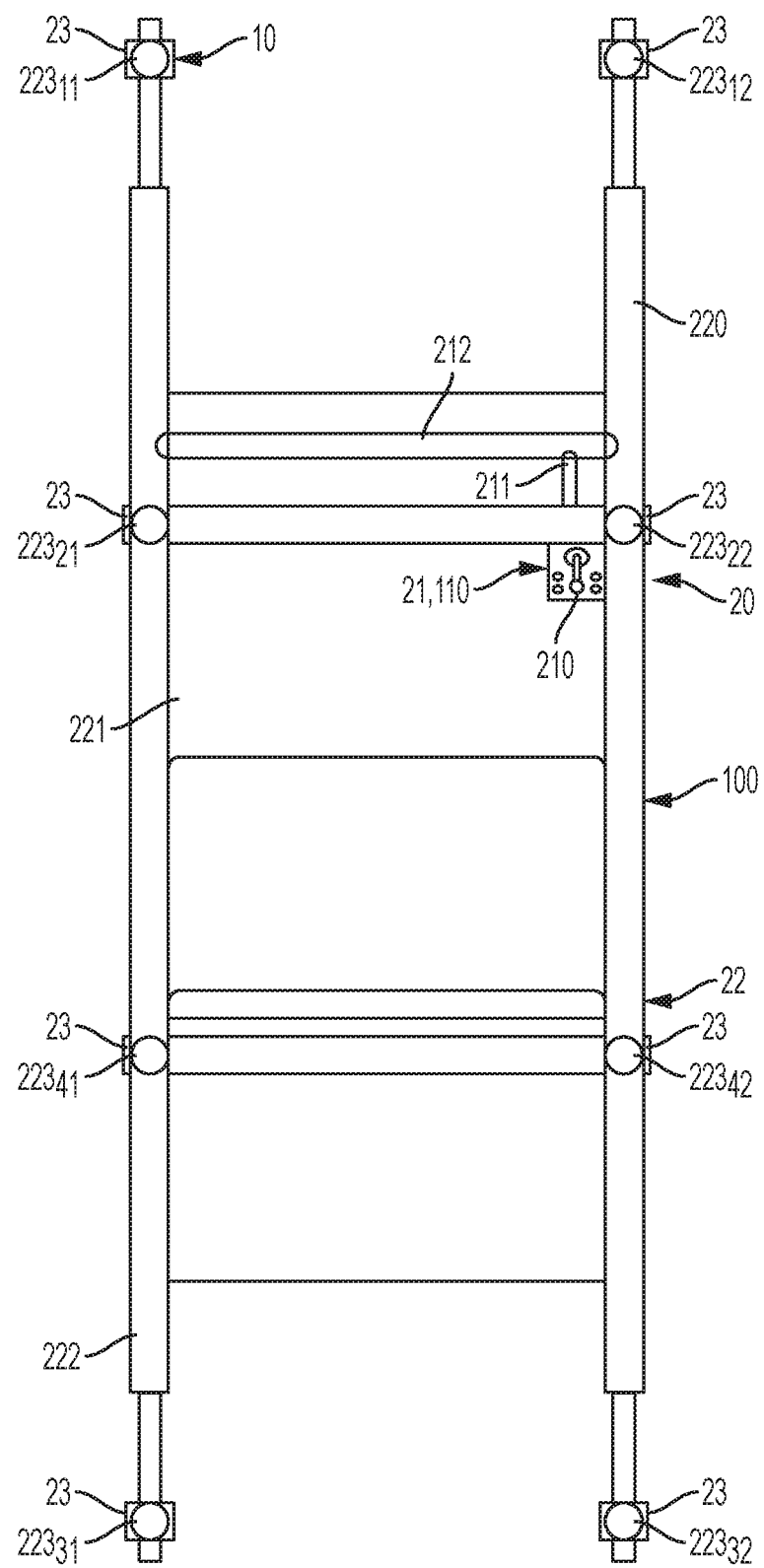
FIG. 7 is a top down view of a vehicle and a steering assembly in accordance with embodiments.
Figure 8:
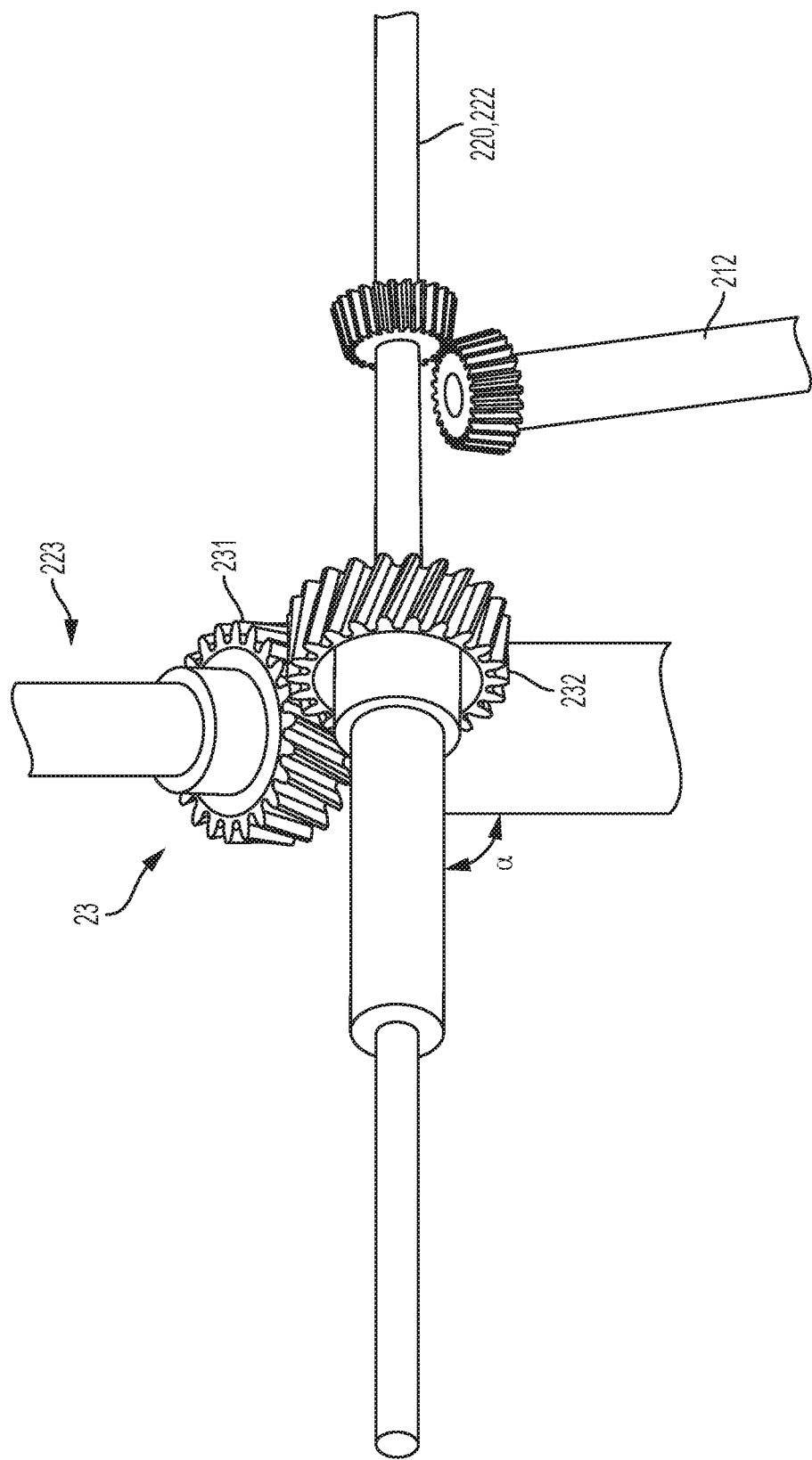
FIG. 8 is a perspective view of a steering and transmission system in accordance with embodiments.
Figure 9:
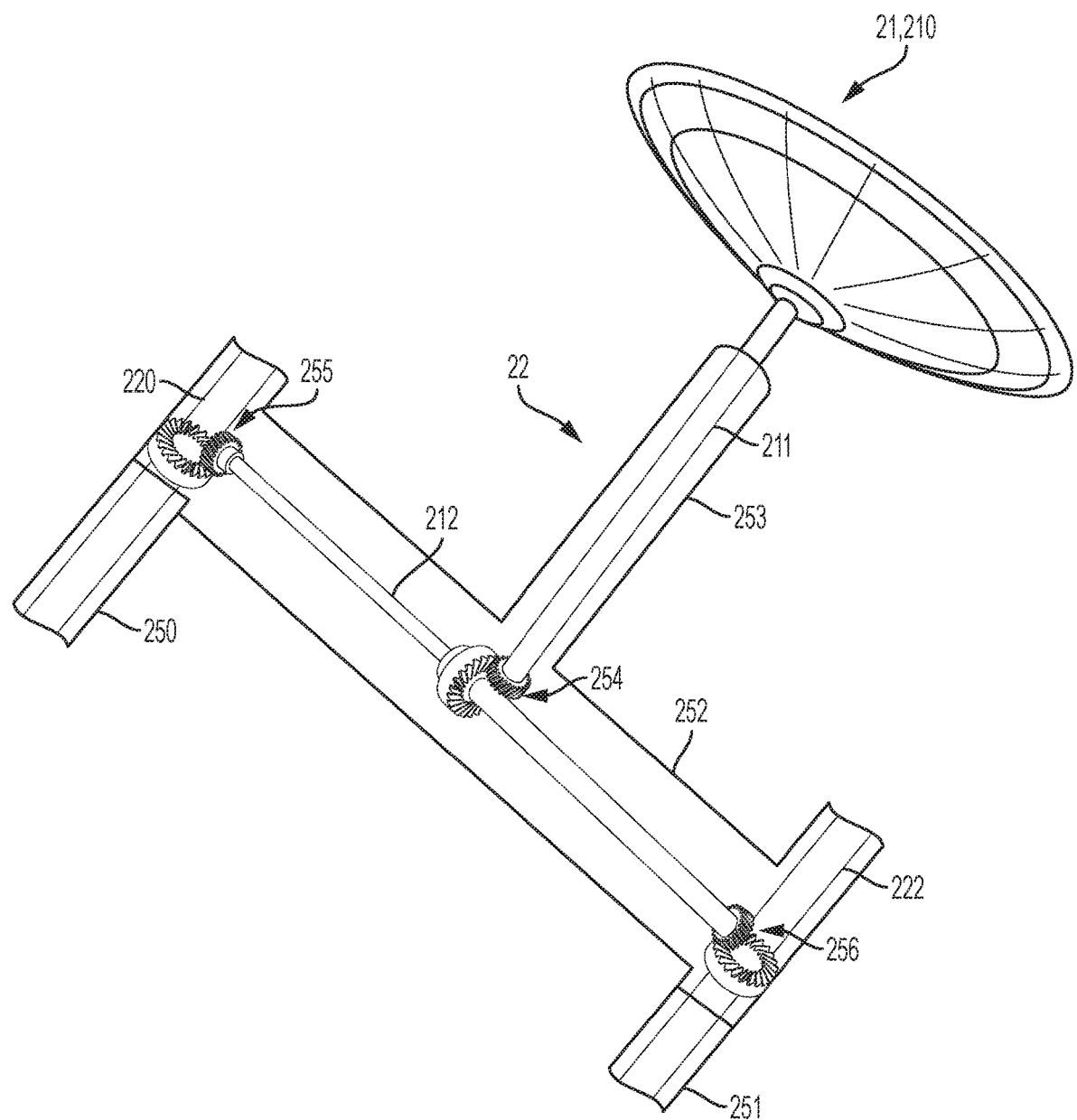
FIG. 9 is a perspective view of a steering system in accordance with embodiments.
Figure 10:
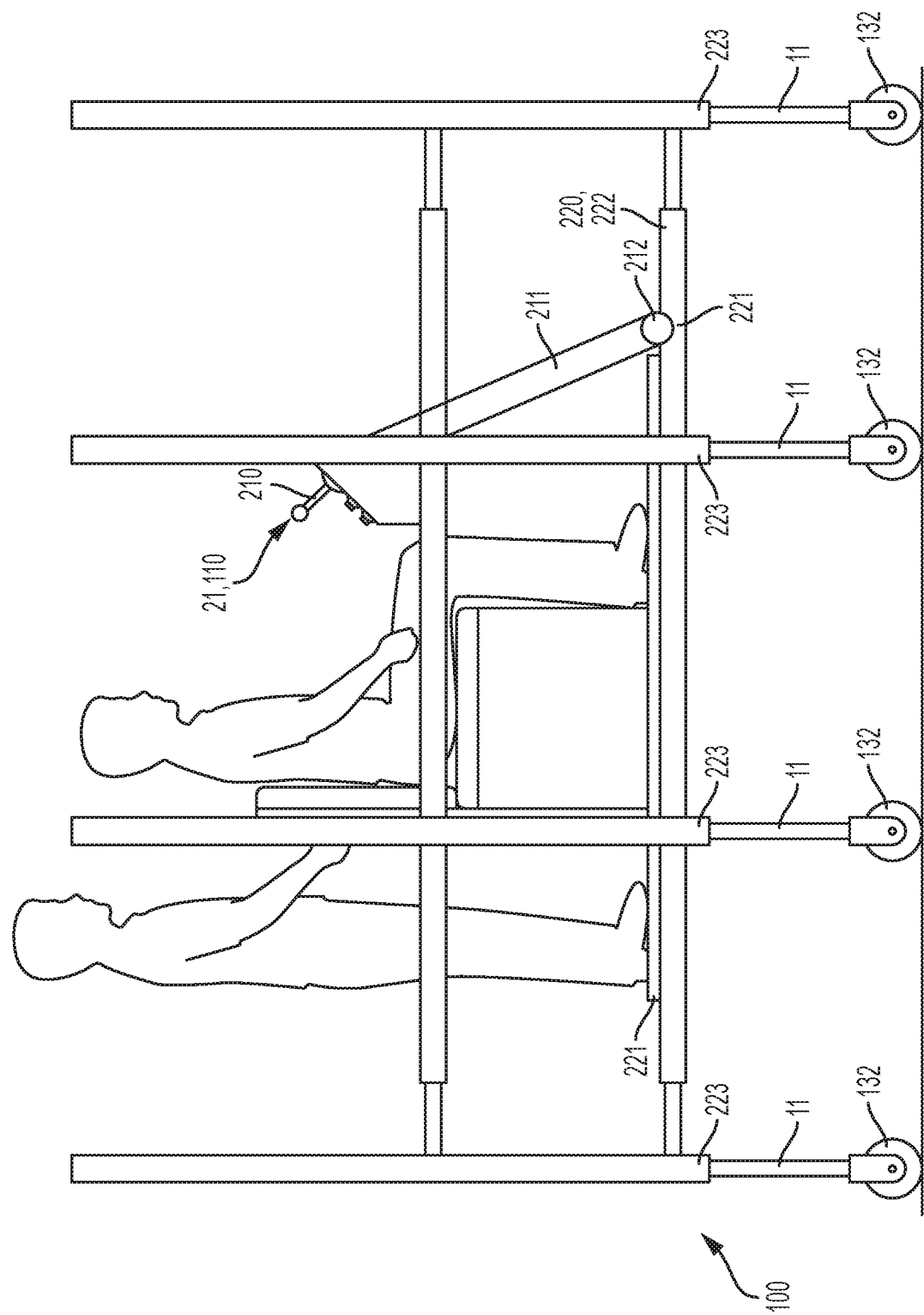
FIG. 10 is a side view of the vehicle and the steering assembly of FIG. 7.

With reference to FIGS. 7-9, a steering assembly 20 is provided and includes a steering command input portion 21 by which operator inputted steering commands are receivable, a transmission portion 22 and couplings 23. The transmission portion 22 includes a first lateral drive shaft 220 that is arranged along a first side of a deck 221 (see, e.g., the platform 30 in the '671 Patent), and a second lateral drive shaft 222 that is arranged along a second side of the deck 221. The transmission portion 22 is configured to transmit steering movements that are associated with the operator inputted steering commands from the steering command input portion 21 toward legs 223 (see, e.g., the rods 210, 212, etc. in the '671 Patent).

The steering command input portion 21 may be provided as an operator accessible input device 210, such as a steering wheel or a joystick, which is disposed above a plane of the deck 221. The steering command input portion 21 may also include at least first and second transverse drive shafts 211, 212. In such cases, the first transverse drive shaft 211 is coupled at opposite ends thereof to the operator accessible input device 210 and the second transverse drive shaft 212 with the second transverse drive shaft 212 extending between its respective couplings with the first and second lateral drive shafts 220 and 222. With such a construction, operator input steering commands are transmitted as steering movements (e.g., rotational or translational movements) from the operator accessible input device 210 to the first transverse drive shaft 211, from the first transverse drive shaft 211 to the second transverse drive shaft 212 and from the second transverse drive shaft 212 to both of the first and second lateral drive shafts 220 and 222.

The legs 223 extend from the deck 221 toward a ground level at fore and aft positions of the deck 221 and at the first and second sides of the deck 221 and are each respectively coupled to the corresponding one of the first lateral drive shaft 220 and the second lateral drive shaft 222 by way of a corresponding one of the couplings 23. More particularly, the legs 223 may include first fore legs $223_{11}$, $223_{12}$ on either side of the deck 221 at a forward-most axial position, second fore legs $223_{21}$, $223_{22}$ at a proximal, forward axial position, first aft legs $223_{31}$, $223_{32}$ on either side of the deck 221 at an aft-most axial position and second aft legs $223_{41}$, $223_{42}$ at a proximal, aft axial position.

Each of the couplings 23 is configured to rotate the corresponding leg 223 in accordance with the steering movements and a fore or aft position of the corresponding leg 223. That is, for a given right-turn steering command that is transmitted toward the legs 223 by the first and second lateral drive shafts 220 and 221, the couplings 23 for the first fore legs $223_{11}$, $223_{12}$ may turn the first fore legs $223_{11}$, $223_{12}$ a relatively large right-ward degree magnitude, the couplings 23 for the second fore legs $223_{21}$, $223_{22}$ may turn the second fore legs $223_{21}$, $223_{22}$ a relatively small right-ward degree magnitude, the couplings for the first aft legs $223_{31}$, $223_{32}$ may turn the first aft legs $223_{31}$, $223_{32}$ a relatively large left-ward degree magnitude and the couplings for the second aft legs $223_{41}$, $223_{42}$ may turn the second aft legs $223_{41}$, $223_{42}$ a relatively small left-ward degree magnitude.

In accordance with embodiments, the couplings 23 may be provided as threaded engagements between the first and second lateral drive shafts 220 and 221 and each of the legs 223. The threaded pitch of the first fore legs $223_{11}$, $223_{12}$ would be different from that of the second fore legs $223_{21}$, $223_{22}$ and opposite from that of the first aft legs $223_{31}$, $223_{32}$. Similarly, the threaded pitch of the first aft legs $223_{31}$, $223_{32}$ would be different from that of the second aft legs $223_{41}$, $223_{42}$ and the threaded pitch of the second aft legs $223_{41}$, $223_{42}$ would be opposite from that of the second fore legs $223_{21}$, $223_{22}$.

As shown in FIG. 8, the couplings 23 include a turret gear 231 disposed about a rotatable housing 11 of a corresponding leg 223. The turret gear engages with a helical gear 232 of the corresponding one of the first and second lateral drive shafts 220 and 222 (with the first and second lateral drive shafts 220 and 222 provided at an angle α, which may be 90° for example, with respect to the rotatable housing 11 and the corresponding leg 223). Thus, when the helical gear 232 rotates bi-directionally (with the one of the first and second lateral drive shafts 220 and 222), the helical gear 232 rotates the rotatable housing 11 of the leg 223. In accordance with embodiments, each of the rotatable housings 11 may be located outside (relative to the deck 221) of the first and second lateral drive shafts 220 and 221.

As shown in FIG. 9, embodiments of the steering command input portion 21 and the transmission portion 22 will now be described. In accordance with these embodiments, the transmission portion 22 includes first and second structural tubing 250 and 251 that running fore and aft longitudinally on the right and left sides of the deck 221. The first and second structural tubing 250 and 251 do not rotate relative to the deck 221 and are disposed to extends coaxially about the first and second lateral drives shafts 220 and 222, respectively. Transverse structural tube 252 connects the first and second structural tubing 250 and 251 at or near a front of the deck 221 and is disposed coaxially about the second transverse drive shaft 212. A similar structural tube may be provided at or near a rear of the deck 221 and also may be disposed coaxially about a drive shaft similar to the second transverse drive shaft 212.

A steering wheel or another similar device may be supported on a steering column 253, which is disposed coaxially about the first transverse drive shaft 211. The first transverse drive shaft 211 is rotatably driven by the steering wheel in both forward and reverse directions (i.e., the first transverse drive shaft 211 is bi-directionally rotatable) within the steering column 253. The steering column 253 is supportable on the transverse structural tube 252 and the first transverse drive shaft 211 engages with the second transverse drive shaft 212 by way of bevel gear 254 (bevel gear 254 may, in some cases, be provided as multiple bevel gears 254 with second transverse drive shaft 212 provided as corresponding multiple drive shafts). Thus, rotations of the first transverse drive shaft 211 by the steering wheel are transmitted to the second transverse drive shaft 212. The second transverse drive shaft 212 engages with the first and second lateral drive shafts 220 and 222 by way of secondary bevel gears 255 and 256. Thus, rotations of the second transverse drive shaft 212 by the first transverse drive shaft 211 are transmitted to the first and second lateral drive shafts 220 and 222.

With continued reference to FIGS. 7-10, a vehicle 100 is provided and may include one or both of the drive assembly 10 and the steering assembly 20 as they are each described above. That is, the vehicle 100 may include the deck 221 with an operator control portion 110, including the steering command input portion 21, supportively disposed thereon, the first and second lateral drive shafts 220 and 221 arranged along the first and second sides of the deck 221 and drive assemblies 10 installed within some or all of the legs 223. With such a configuration, the legs 223 are rotatable by the steering assembly 20 in order to steer the vehicle 100 and the drive assemblies 10 are operable to propel the vehicle 100 forwardly or reversely and to extend or retract the legs 223.

Figure 11:
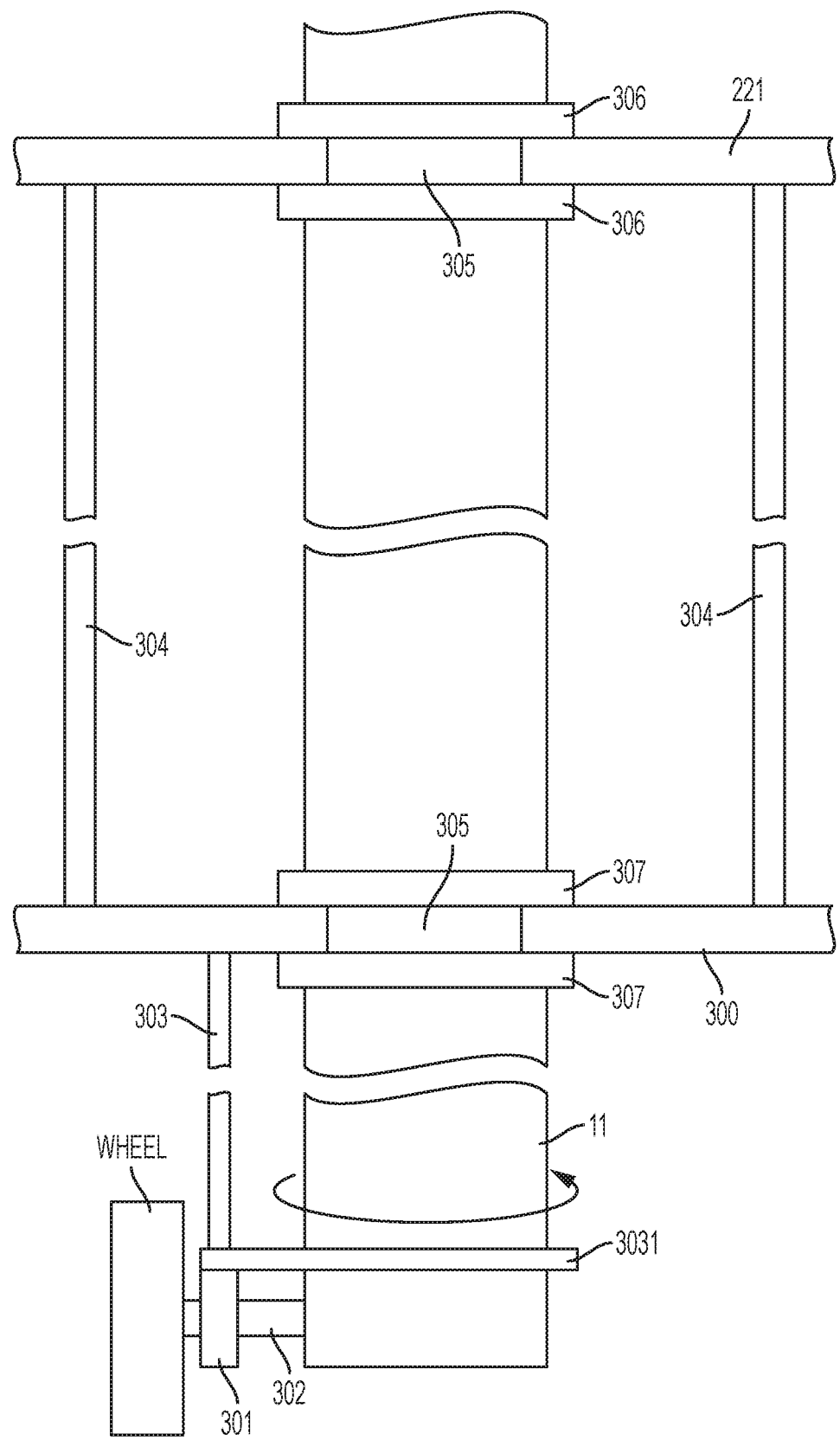
FIG. 11 is a side schematic view of structural support features of the vehicle of FIG. 7.

With reference to FIG. 11, an additional deck 300 may be provided above or below the deck 221 to serve multiple purposes. These include providing vertically secured structure to the legs 223 so that the legs are prevented from swaying uncontrollably and for providing space between the deck 221 and the additional deck 300 for batteries, computing devices, wire harnesses and communications cables. Also, the additional deck 300 may be configured and disposed to provide support for the vehicle 100 as a whole by riding on bearings 301 that in turn ride on axles 302 of the gear train or bevel gear arrangement 133.

For example, where the additional deck 300 is provided below the deck 221, the additional deck 300 may include first struts 303 and second struts 304. The first struts 303 are coupled to the bearings 301 and have lower circumferential extensions 3031 such that the additional deck 300 is supported on the axles 302 for rotations of the rotatable housings 11. The deck 221 is then supported on the second struts 304 such that the deck 221 is supported over the additional deck 300. In these or other cases, the deck 221 and the additional deck 300 may include bosses 305 while the rotatable housings 11 include upper guides 306 and lower guides 307. Each set of upper guides 306 surround the bosses of the deck 221 and each set of the lower guides 307 surround the bosses of the additional deck 300 to provide for vertical support of the rotatable housings 11 while permitting rotation thereof (with the bosses 305 being translatable through the upper and lower guides 306 and 307).

In accordance with still further embodiments, the first and second lateral drive shafts 220 and 221 may be forwardly and rearwardly splined such that forward portions of the first and second lateral drive shafts 220 and 221 can be extended forwardly without an interruption of torque transmittance and such that rearward portions of the first and second lateral drive shafts 220 and 221 can be extended rearwardly without an interruption of torque transmittance. In these or other cases, the vehicle 100 may include longitudinal fore-aft horizontal actuators that drive the first fore legs $223_{11}$, $223_{12}$ forward and the first aft legs $223_{31}$, $223_{32}$ rearward and thus cause the first and second lateral drive shafts 220 and 221 to be extended forwardly or rearwardly. The horizontal actuators may include a lead screw that turns inside a housing (e.g., the first and second structural tubing 250 and 251) and a fixed nut assembly that causes a linear actuator rod to telescope out and protrude from the housing. Bi-directional and variable speed motors may be provided between the deck 221 and the additional deck to drive the horizontal actuators and may be synchronized by an on-board computing device. The horizontal actuators may be splined (see, e.g., FIG. 3A) in order to provide for rotation with telescoping capabilities.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A steering assembly, comprising:
    an input portion by which operator commands are receivable;
    a deck;
    a transmission portion comprising drive shafts respectively arranged along opposite sides of the deck;
    legs extending from the deck toward a ground level at fore and aft positions and the opposite sides of the deck, wherein, for each opposite side of the deck, the legs comprise first and second fore legs and first and second aft legs, and the transmission portion is configured to transmit steering movements associated with the operator commands from the input portion toward the legs;
    couplings by which each of the legs is coupled to one of the drive shafts,
    wherein each of the couplings is configured to rotate the corresponding leg in accordance with both the steering movements and a fore or aft position of the corresponding leg and the couplings rotate the first and second fore legs by different degrees and the first and second aft legs by different degrees.

2. The steering assembly according to claim 1, wherein the input portion comprises an operator accessible input device.

3. The steering assembly according to claim 1, wherein at least the input portion is disposed above a plane of the deck.

4. The steering assembly according to claim 1, wherein the input portion comprises at least first and second transverse drive shafts.

5. A vehicle, comprising:
- a deck having first and second edges opposite one another and third and fourth edges extending between the first and second edges;
- first, second and third shafts disposed at the first, third and fourth edges, respectively, the second and third shafts being rotatable by rotations of the first shaft, wherein the second and third shafts each comprise splined extensions which are rotatable with the second and third shafts and by which the second and third shafts are extendable beyond the first and second edges;
- a steering input supported above the deck to drive the rotations of the first shaft;
- first and second sets of rotatable legs, which extend downwardly from the third and fourth edges, respectively, and which are respectively rotatable by respective rotations of the second and third shafts; and
- additional rotatable legs, which extend downwardly from the splined extensions, respectively, and which are respectively rotatable by respective rotations of the splined extensions.

6. The vehicle according to claim 5, wherein the first and second edges are minor edges of the deck and the third and fourth edges are major edges of the deck.

7. The vehicle according to claim 6, wherein the first shaft extends along the first edge and the second and third shafts extend along the third and fourth edges, respectively.

8. The vehicle according to claim 5, wherein each of the first and second sets of rotatable legs comprises a wheel element at a lower end thereof.

9. The vehicle according to claim 5, wherein:
- respective rotation rates of each of the first set of rotatable legs vary relative to a distance from the corresponding leg to the first edge, and
- respective rotation rates of each of the second set of rotatable legs vary relative to a distance from the corresponding leg to the first edge.

* * * * *